US012707067B2

(12) United States Patent
Bodenhoff

(10) Patent No.: US 12,707,067 B2
(45) Date of Patent: Aug. 11, 2026

(54) VIDEO SURVEILLANCE SYSTEM HAVING A LOAD DISTRIBUTION MODULE

(71) Applicant: Milestone Systems A/S, Brøndby (DK)

(72) Inventor: Michael Henrik Bodenhoff, Brøndby (DK)

(73) Assignee: Milestone Systems A/S, Brøndby (DK)

( * ) Notice: Subject to any disclaimer, the term of this patent is extended or adjusted under 35 U.S.C. 154(b) by 54 days.

(21) Appl. No.: 18/545,935

(22) Filed: Dec. 19, 2023

(65) Prior Publication Data

US 2024/0214583 A1 Jun. 27, 2024

(30) Foreign Application Priority Data

Dec. 21, 2022 (GB) ..................................... 2219412
Dec. 21, 2022 (GB) ..................................... 2219415

(51) Int. Cl.
*H04N 19/42* (2014.01)
*H04N 7/18* (2006.01)
*H04N 19/172* (2014.01)

(52) U.S. Cl.
CPC .................................. *H04N 19/172* (2014.11)

(58) Field of Classification Search
CPC .... H04N 19/00; H04N 7/18; H04N 21/23103; H04N 21/4424; H04N 19/42; G06F 9/505; G06F 3/0604; G06F 9/5083
See application file for complete search history.

(56) References Cited

U.S. PATENT DOCUMENTS

2011/0157193 A1* 6/2011 Boucher ............... G06F 9/5083 345/1.3
2012/0001925 A1* 1/2012 Andonieh ............... G06F 15/16 345/502
2014/0340410 A1 11/2014 Wu
2021/0208949 A1 7/2021 Bijwe
2023/0127325 A1* 4/2023 Strandby .............. H04N 19/127 348/159
2023/0161632 A1* 5/2023 Herz ....................... G06F 9/505 718/105

FOREIGN PATENT DOCUMENTS

CN 102036043 A 4/2011
WO 2012/079453 A1 6/2012
WO 2019/229213 A1 12/2019

* cited by examiner

*Primary Examiner* — Kyle M Lotfi
(74) *Attorney, Agent, or Firm* — Canon U.S.A., Inc. IP Division

(57) ABSTRACT

A video surveillance system comprising an operator client including a system memory, a plurality of display devices for displaying video data and resources for decoding of encoded video data for display, including a plurality of GPUs, wherein each of the display devices is connected to a graphics output port of one of the GPUs. A load distribution module is configured to send a stream of encoded video data to one of the decoding resources by determining a first display device the stream of video data is to be displayed after decoding, and sending the stream of video data to a first GPU for decoding and display on the selected display device, wherein the first GPU is connected to the first display device, unless the first GPU is overloaded. If the first GPU is overloaded, the load distribution module sends the stream of video data to a second GPU for decoding.

14 Claims, 7 Drawing Sheets

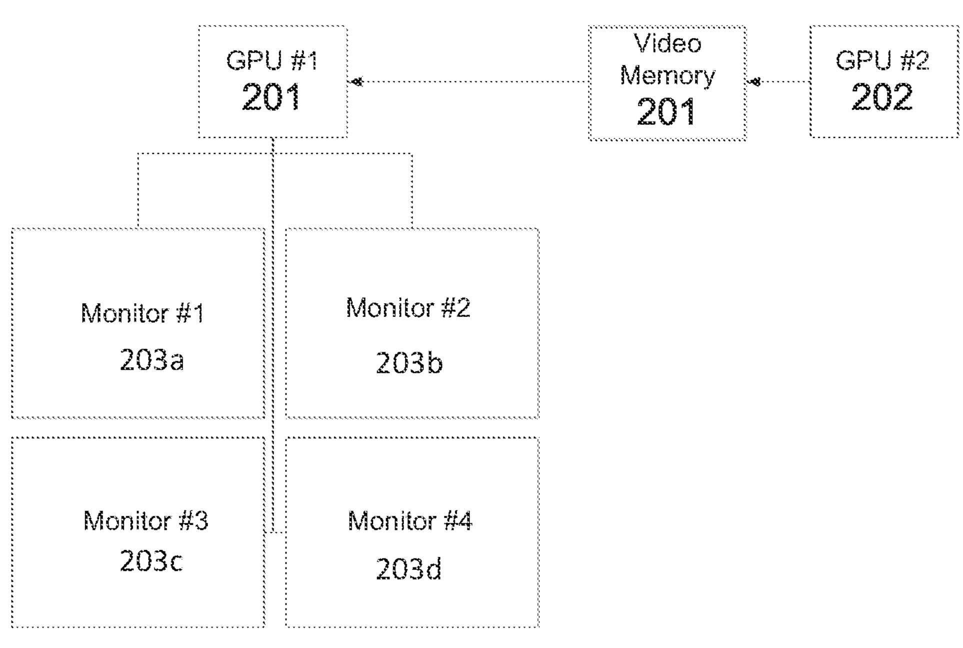
FIGURE 3A (Prior Art)
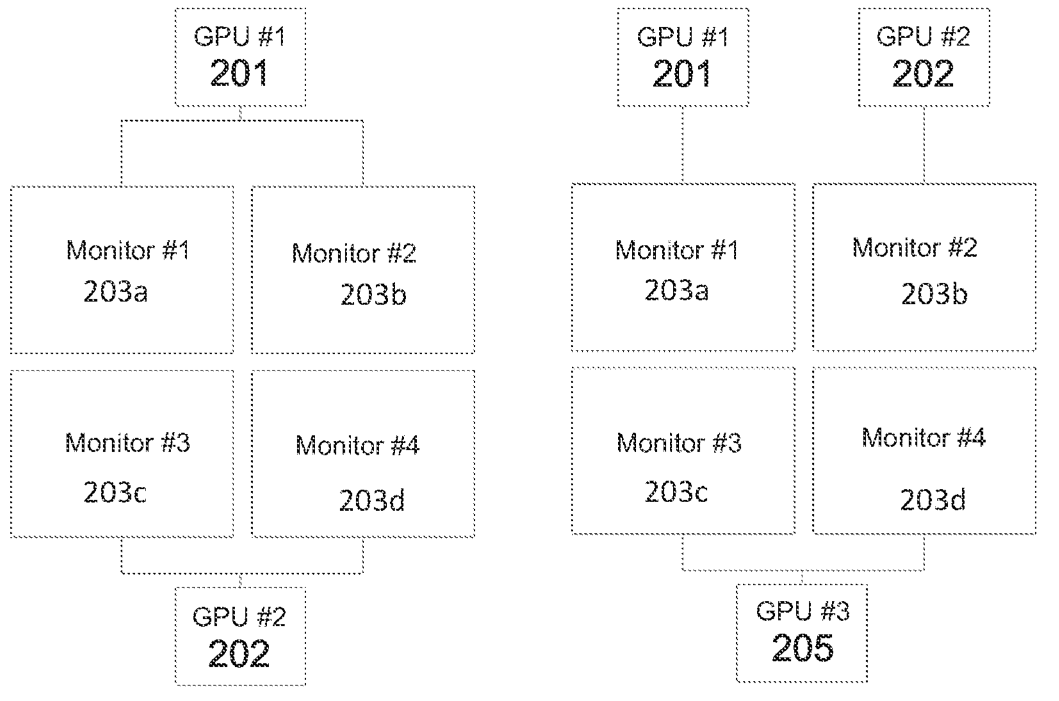
FIGURE 3B
FIGURE 3C

VIDEO SURVEILLANCE SYSTEM HAVING A LOAD DISTRIBUTION MODULE

CROSS-REFERENCE TO RELATED APPLICATIONS

This application claims the benefit under 35 U.S.C. § 119(a)-(d) of United Kingdom Patent Application No. 2219412.0, filed on Dec. 21, 2022 and titled "VIDEO SURVEILLANCE SYSTEM HAVING A LOAD DISTRIBUTION MODULE" and United Kingdom Patent Application No. 2219415.3, filed on Dec. 21, 2022 and titled "VIDEO 2022 SURVEILLANCE SYSTEM HAVING A LOAD DISTRIBUTION MODULE". The above cited patent applications are incorporated herein by reference in their entirety.

TECHNICAL FIELD OF THE DISCLOSURE

The present disclosure relates to a video surveillance system having decoding resources including a plurality of GPUs and a load distribution module, and a method for distributing video decoding processes in the video surveillance system.

BACKGROUND OF THE DISCLOSURE

In a video surveillance system, it is necessary for multiple streams of video data to be decoded simultaneously. This can occur, for example, in a client device which is receiving streams of encoded video data from multiple cameras in order to display multiple streams simultaneously to an operator. This can also occur in a recording server or an analytics server which may be decoding multiple streams of video data from multiple cameras in order to perform video analytics such as motion detection or facial recognition. This can also occur in a mobile server which may decode video and encode it in another format or at a lower quality level for streaming to mobile devices.

A recording server or a client device will include a CPU, and video decoding can be carried out by software running on the CPU. However, video decoding can be carried out more efficiently by hardware devices such as GPUS (graphic processing units). Therefore, the efficiency of video decoding can be improved by providing hardware acceleration i.e. providing a plurality of hardware devices dedicated to video decoding. Hardware acceleration also increases the number of streams that can be decoded and displayed. Two types of GPU can be provided, discrete GPUs and integrated GPUs. An integrated GPU is one provided as a chip inside the CPU and is built into the CPU. An integrated GPU uses system memory that is shared with the CPU. An example is an Intel GPU which is provided as part of an Intel CPU. Discrete GPUs are separate from the CPU and have their own dedicated memory that is not shared with the CPU.

An example of a commonly used discrete GPU is an NVIDIA card.

Therefore, in a hardware accelerated system including a plurality of hardware decoders and resources for software decoding, there is a need for logic to efficiently allocate the decoding loads between the various hardware devices and the software, and to dynamically balance the loads during runtime.

WO2019/229213 discloses a load balancing method for video decoding in a system providing hardware and software decoding resources, in which decoding threads are balanced between the various hardware and software resources.

However, it is not always preferable to equally balance the load amongst the decoding resources. There are circumstances where it may increase performance to use particular decoding resources, and also to maximise the load on a particular decoding resource regardless of the loads on other decoding resources.

SUMMARY OF THE DISCLOSURE

According to a first aspect of the present disclosure there is provided a video surveillance system according to claims 1 to 9.

According to a second aspect of the present disclosure there is provided a load distribution method for video decoding in a video surveillance system.

A second aspect of the present disclosure provides a video surveillance system comprising:

resources for decoding of encoded video data, including a plurality of GPUs; and a load distribution module configured to send a stream of encoded video data to one of the decoding resources;

wherein the load distribution module is configured to:

select a GPU;

determine if the selected GPU is overloaded; and send the stream of encoded video data to the selected GPU for decoding if the selected GPU is not overloaded;

wherein the load distribution module is configured to determine if the selected GPU is overloaded by:

estimating a bitrate required to decode the stream of video data, determining the total bitrate of decoding processes currently running on the selected GPU and determining that the selected GPU is overloaded if decoding the stream of video data on the selected GPU would exceed a maximum bitrate of the GPU.

In the second aspect, preferably the load distribution module is configured to estimate the maximum bitrate of the selected GPU, based on a current load and the bitrates of current decoding processes. The estimation of the maximum bitrate may be carried out, and then the maximum bitrate of the GPU may be stored and used by the load balancing module for use in future determinations.

In the second aspect, the bitrate required to decode the stream of video data may be estimated as:

$$\text{Bitrate per second} = \text{WidthOfFrame} * \text{HeightOfFrame} * \text{NumberOfBitplanes} * \text{FramesPerSecond}.$$

In the second aspect, preferably the system further comprises:

a plurality of display devices for displaying video data wherein each of the display devices is connected to a graphics output port of one of the GPUs;

wherein the load distribution module is configured to:

determine a selected display device as a display device the stream of video data is to be displayed on after decoding, and determine the selected GPU as the GPU to which the selected display device is connected; and if the selected GPU is overloaded, send the stream of video data to another decoding resource for decoding and display on the selected display.

Each of the GPUs may have at least one display device connected to it, each display device being connected to a different graphics output port.

The resources for decoding of encoded video data may further include for resources software decoding comprising a video codec program module executable by at least one CPU core, and an integrated GPU provided as a chip inside the CPU.

If the selected GPU is overloaded, the load distribution module sends the stream of video data to another decoding resource, and the other decoding resource may be selected as the decoding resource having a highest maximum bitrate for decoding and which is not overloaded.

BRIEF DESCRIPTION OF THE DRAWINGS

Embodiments of the present disclosure will now be described, by way of example only, with reference to the accompanying drawings in which:

FIG. 3A illustrates a prior art arrangement of GPUS and display devices;

FIGS. 3B and 3C illustrate arrangements of GPUs and display devices for implementing the present disclosure;

DETAILED DESCRIPTION OF THE DISCLOSURE

Figure 1:
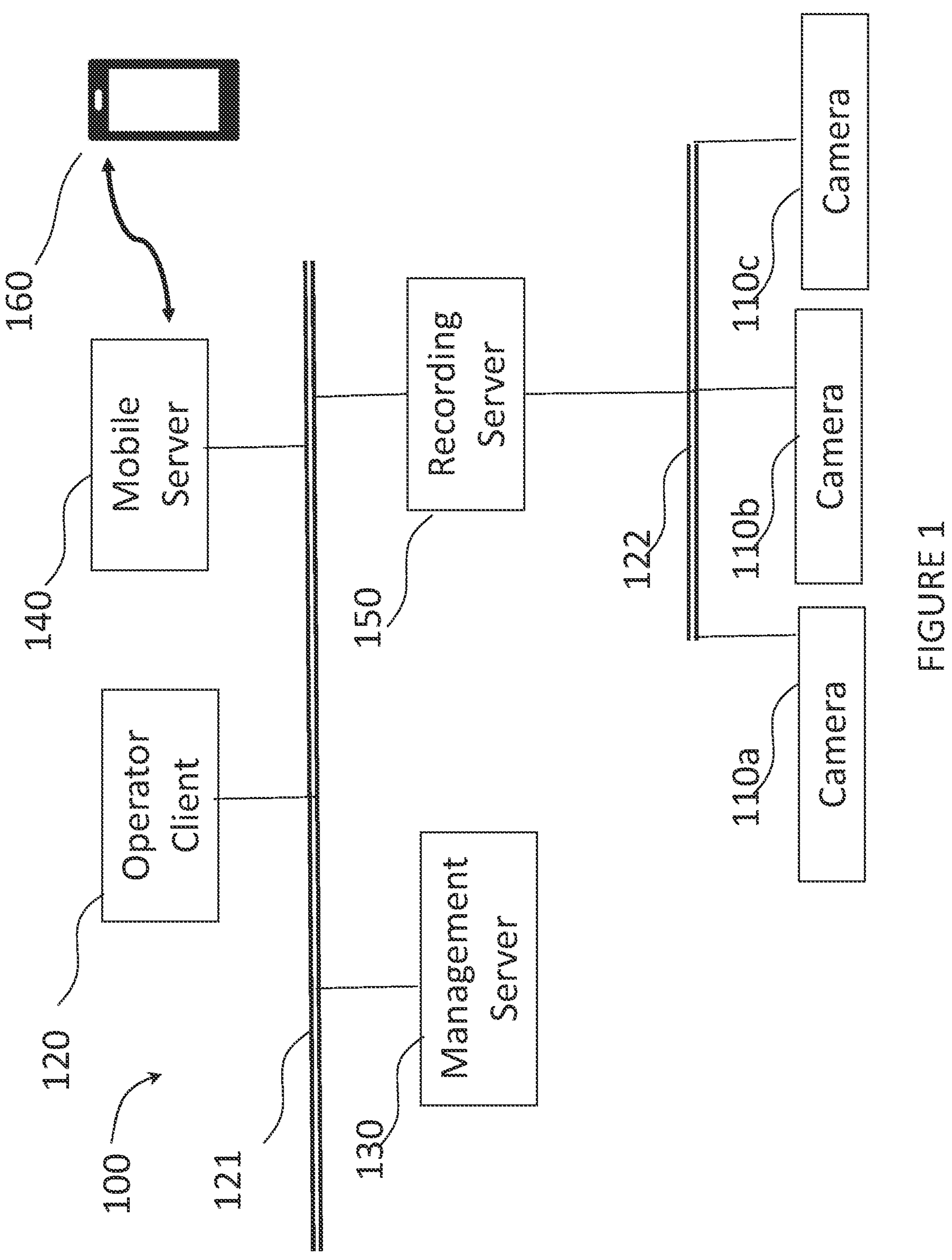
FIG. 1 illustrates an example of a video surveillance system.

FIG. 1 shows an example of a video surveillance system 100 in which embodiments of the present disclosure can be implemented. The video surveillance system 100 comprises a management server 130, a recording server 150 and a mobile server 140. Further servers may also be included, such as further recording servers, archive servers or analytics servers. A plurality of video surveillance cameras 110*a*, 110*b*, 110*c* send video data to the recording server 150. An operator client 120 is a user terminal which provides an interface via which an operator can view video data live from the cameras 110*a*, 110*b*, 110*c*, or recorded video data from the recording server 150 on a plurality of display devices (monitors).

The cameras 110*a*, 110*b*, 110*c* capture image data and send this to the recording server 150 as a plurality of video data streams.

The recording server 150 stores the video data streams captured by the video cameras 110*a*, 110*b*, 110*c*. Video data is streamed from the recording server to the operator client 120 depending on which live streams or recorded streams are selected by an operator, and displayed on a plurality of display devices, each of which may display multiple streams, for example in multiple windows.

The mobile server 140 communicates with a user device 160 which is a mobile device such as a smartphone or tablet. The user device 160 can access the system from a browser using a web client. Via the user device 160 and the mobile server 140, a user can view recorded video data stored on the recording server 150. The user can also view a live feed via the user device 160.

Other servers may also be present in the system 100. For example, an archiving server (not illustrated) may be provided for archiving older data stored in the recording server 150 which does not need to be immediately accessible from the recording server 150, but which it is not desired to be deleted permanently. A fail-over recording server (not illustrated) may be provided in case a main recording server fails. An analytics server can also run analytics software for image analysis, for example motion or object detection, facial recognition, event detection.

The operator client 120 and the mobile server 140 are configured to communicate via a first network/bus 121 with the management server 130 and the recording server 150. The recording server 150 communicates with the cameras 110*a*, 110*b*, 110*c* via a second network/bus 122.

The cameras 110*a*, 110*b*, 110*c* are configured to capture a video and encode the captured video by means of a video encoder. The video encoder may implement motion compensation, i.e. exploiting the temporal redundancy in a video, and deliver compressed video data to the recording server 150. Video data can be compressed with different compression levels, e.g. highly-compressed (lower quality) and less-compressed (higher quality) videos.

Video encoders without motion compensation may implement, for example, the M-JPEG standard. Video encoders using motion compensation may implement for example one of the MPEG standards (MPEG-1, H.262/MPEG-2, H.263, H. 264/MPEG-4 AVC, H.265/HEVC, H. 266/VVC). The compressed videos thus comprising a sequence of intra-coded I frames (pictures that are coded independently of all other pictures) and predicted P frames (pictures that contain motion-compensated difference information relative to previously decoded pictures). The frames are (Group Of Pictures). An I frame grouped into GOPs indicates the beginning of a GOP.

In the system of FIG. 1, decoding of the video streams may be undertaken by several components of the system. In particular, the operator client 120 must decode video data for display. The operator can select multiple cameras for display simultaneously on multiple monitors (display devices) and/or multiple windows on a monitor. The operator can also select to view recorded video data from the recording server 150. This means that the operator client 120 must simultaneously decode multiple streams of video data. Modern video surveillance systems can simultaneously display 20 or 30 video feeds simultaneously, or even more. Furthermore, the operator can change the selection of recorded or live camera feeds for display whenever they choose, and also the display can be automatically switched to display different camera feeds based on detection of events, for example motion. Thus, the operator client 120 needs to be able to handle the decoding of large numbers of constantly changing video decoding processes, or threads.

The operator client 120 will include a CPU, and video decoding can be carried out by software running on the CPU. However, video decoding can be carried out more efficiently by hardware devices or GPUs. Therefore, the efficiency of video decoding can be improved by providing hardware acceleration i.e. providing a plurality of hardware devices dedicated to video decoding. Hardware acceleration also increases the number of streams that can be decoded simultaneously.

The present disclosure is implemented in a video surveillance system in which a CPU is supplemented by a plurality of hardware decoder devices (GPUS), so that decoding can be carried out by both software and hardware.

Two types of GPU can be provided, discrete GPUs and integrated GPUs. An integrated GPU is one provided as a chip inside the CPU and is built into the CPU. An integrated GPU uses system memory that is shared with the CPU. An example is an Intel GPU which is provided as part of an Intel CPU. Discrete GPUs are separate from the CPU and have their own dedicated memory that is not shared with the CPU. An example of a commonly used discrete GPU is an NVIDIA card.

The present disclosure will be described particularly with reference to an embodiment of a video surveillance system having an operator client including a plurality of GPUs, which may include at least one discrete GPU as well as an integrated GPU, and a CPU.

In an operator client having a plurality of GPUs and a plurality of display devices (monitors), the monitors are connected to graphics output ports (eg HDMI, Displayport) of the GPUs. In the case of an integrated GPU, this will be a "monitor out" port on the motherboard that the integrated GPU can access. In a known video surveillance system in which load balancing is used, it is not known which GPU will decode video streams displayed on which display device, and therefore the most efficient way to set up the system is to connect all of the display devices via the most powerful GPU.

Figure 2:
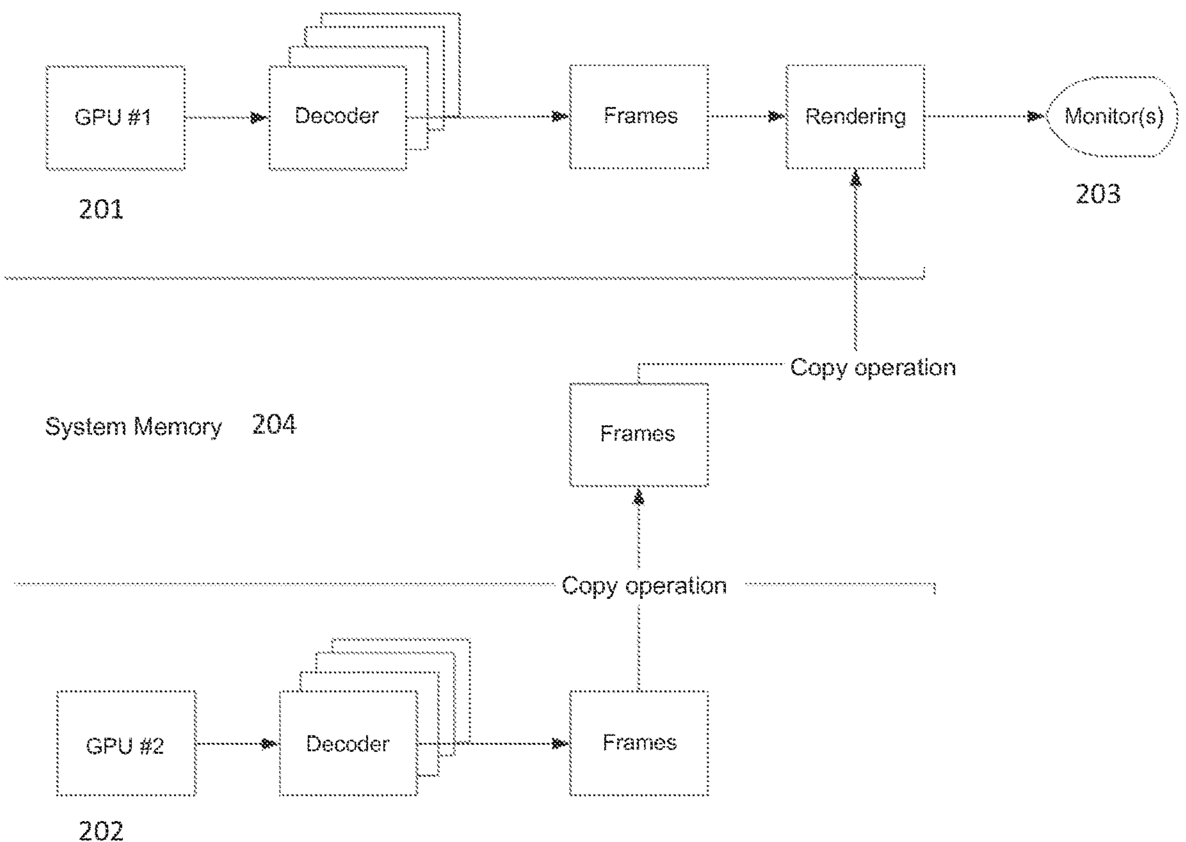
FIG. 2 illustrates decoding and rendering of a video stream for display on a display device.

FIG. 2 illustrates decoding of video on a first GPU 201 and a second GPU 202. A display device 203 is connected to a graphics output port of the first GPU 201. When a stream of video data for display on the display device 203 is decoded on the first GPU 201, the frames are decoded, rendered and output directly to the monitor 203 via the graphics output port. However, if a stream of video data for display on the monitor 203 is decoded on the second GPU 202, the frames are decoded, but must then be copied via the system memory 204, rendered by the first GPU 201 and output to the display device 203 via the graphics output port of the first GPU 201. This copying of the frames via the system memory 204 costs around 30-75% performance, on average roughly 60%.

So, in a video surveillance system having a plurality of display devices 203 and a plurality of GPUs 201, 202, performance can be improved by ensuring that as many streams as possible are decoded on a GPU that is directly connected to the monitor on which the decoded video is to be displayed. Only if a GPU is overloaded such that one more decoding process would cause it to crash, would a decoding process be load balanced to another decoding resource such as a GPU other than the one to which the display device it is to be displayed on is connected.

Further, it becomes preferable to connect the plurality of display devices to different GPUs, such that each of the GPUs has at least one display device connected to it.

FIG. 3A illustrates a prior art arrangement of an operator client 120 of a video surveillance system having a first GPU 201 and a second GPU 202 and a plurality of display devices 203*a*, 203*b*, 203*c*, 203*d*, which are all connected to graphics output ports of the first GPU 201. The second GPU 202 communicates with the first GPU via the system memory 204, such that if the video surveillance system sends a stream of video data for display on one of the display devices 203*a*, 203*b*, 203*c*, 203*d* to the second GPU 202 for decoding, the decoded frames must be copied via the system memory 204, and then rendered using the first GPU for display on the selected one of the display devices 203*a*, 203*b*, 203*c*, 203*d*, as shown in FIG. 2.

FIGS. 3B and 3C show arrangements that are preferable for use in embodiments of the present disclosure. The arrangement of FIG. 3B includes first and second GPUs 201, 202, and the arrangement of FIG. 3C includes first, second and third GPUs 201, 202, 205. In both arrangements, each of the GPUs 201, 202, 205 are connected to at least one of the display devices 203*a*, 203*b*, 203*c*, 203*d*. The display devices 203*a*, 203*b*, 203*c* are preferably evenly distributed between the GPUs 201, 202 as shown in FIG. 3B, where two display devices are connected to each of the two GPUS. Where this is not possible, as in FIG. 3C where there are four display devices 203*a*, 203*b*, 203*c*, 203*d* and three GPUs 201, 202, 205, more display devices should be connected to the more powerful GPUs. In FIG. 3C, the third GPU 205 is the most powerful and has two display devices 203*c*, 203*d* connected to it and the first and second GPUs 201, 202 have one display device 203*a*, 203*b* each.

Figure 4:
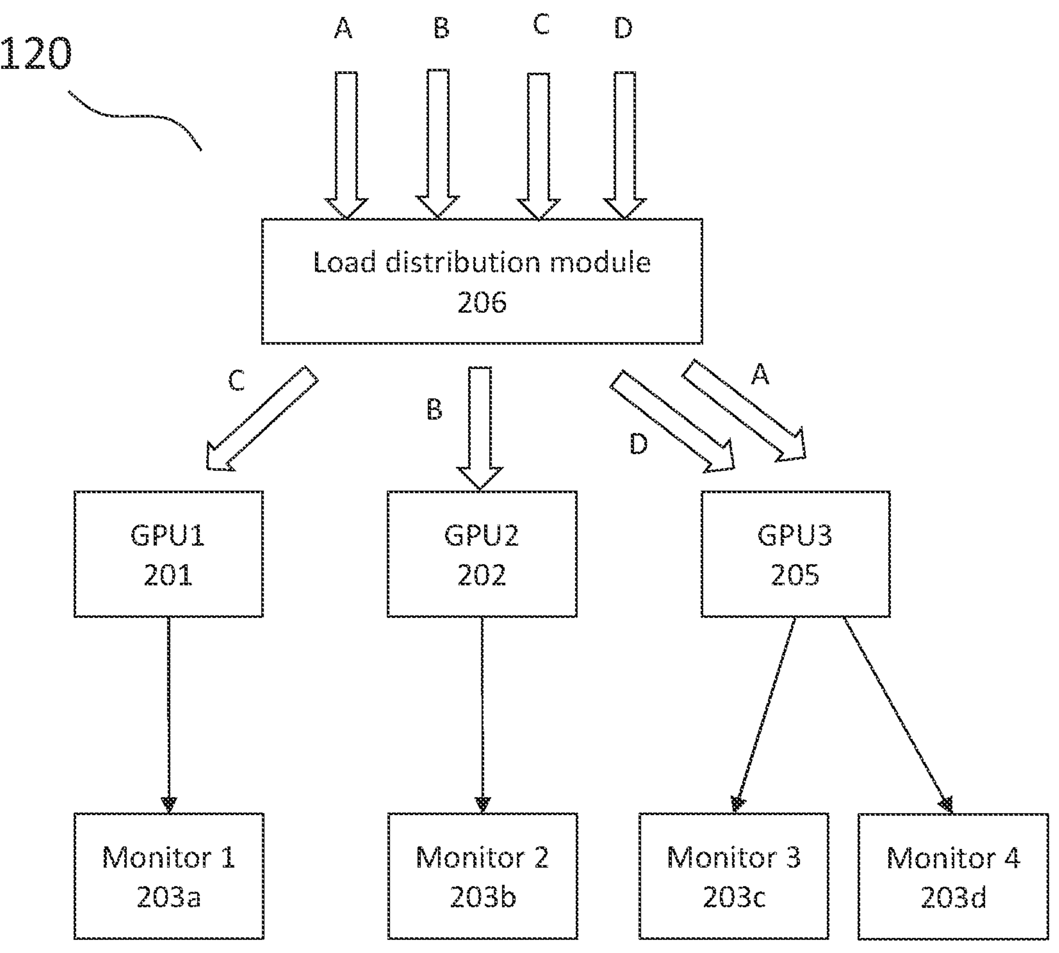
FIG. 4 illustrates an operator client according to an embodiment of the present disclosure.

FIG. 4 illustrates an embodiment of the present disclosure having the arrangement of GPUs and display devices as shown in FIG. 3C. An operator client 120 of a video surveillance system includes the first, second and third GPUS 201, 202, 205, and first, second, third and fourth display devices 203*a*, 203*b*, 203*c*, 203*d*. The first display device 203*a* is connected to a graphics output port of the first GPU 201. The second display device 203*b* is connected to a graphics output port of the second GPU 202. The third display device 203*c* and the fourth display device 203*d* are connected to graphics output ports of the third GPU 205.

The operator client 120 further includes a load distribution module 206, which is responsible for receiving streams A, B, C, D, of encoded video data from the recording server 150, and directing these to the GPUs 201, 202, 205 for decoding and display on the display devices 203*a*, 203*b*, 203*c*, 203*d*.

Figure 5:
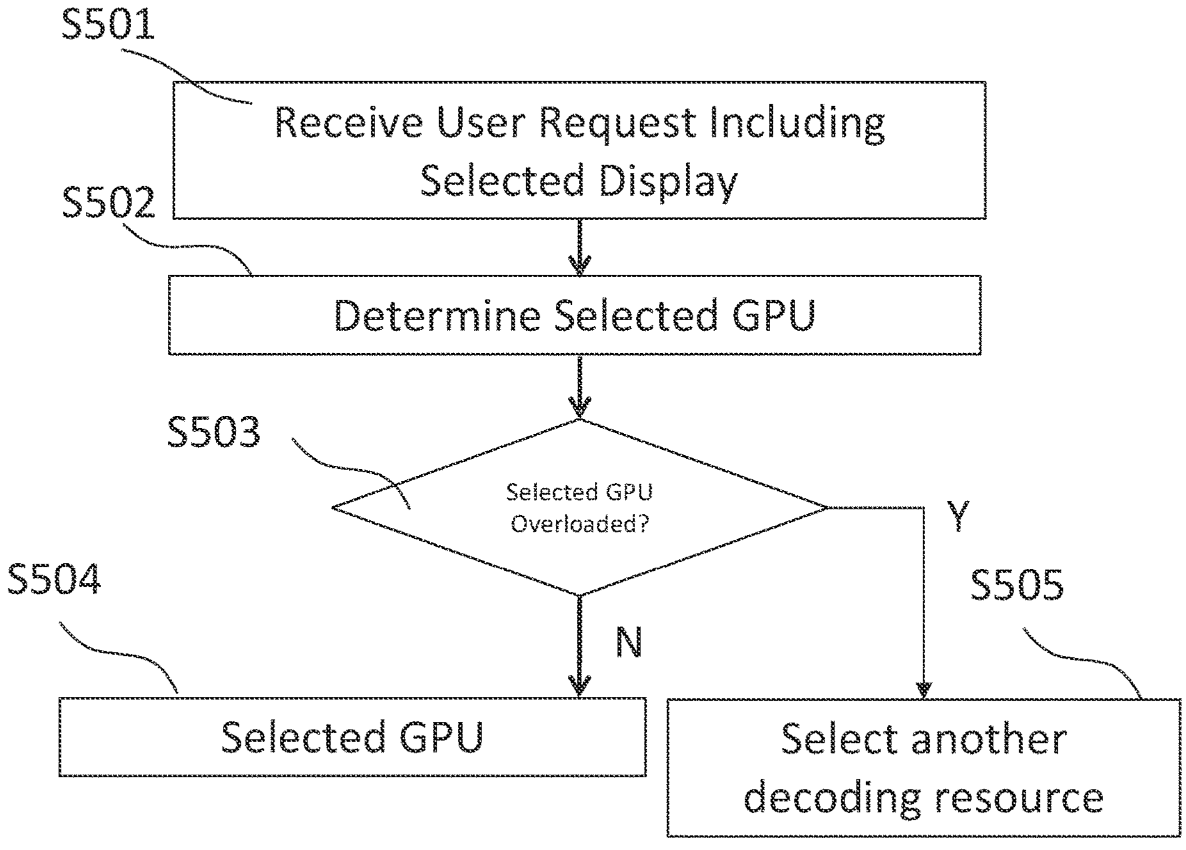
FIG. 5 is a flow diagram illustrating a method of load distribution for a new video stream.

FIG. 5 is a flow diagram illustrating a load distribution method carried out by the load distribution module 206.

When the operator client 120 receives an instruction from a user to display video data from one of the cameras 110*a*, 110*b*, 110*c*, which may be live or recorded video, the operator client 120 requests the video which is streamed as an encoded stream from the recording server 150. At step S501, the load distribution module 206 receives the user request and determines, from the user request, which display device 203*a*, 203*b*, 203*c*, 203*d* the user wants the video to be displayed on (the selected display device). At step S502, the load distribution module 206 then determines which GPU (the selected GPU) the selected display device is connected to.

At step S503, the load distribution module 206 determines whether the selected GPU is overloaded. If it is not, then at step S504, the load distribution module 206 sends the encoded stream to the selected GPU for decoding and display on the selected display device. This therefore avoids a situation whereby video is being copied via the system memory 204. Only if the selected GPU is overloaded does the load distribution module 206 send the stream to another decoding resource (step S505).

For example, as shown in FIG. 4, the load distribution module 206 determines that stream A is to be displayed on the fourth display device 203*d*, and stream D is to be displayed on the third display device 203*c*, and therefore both these streams are sent to the third GPU 205, to which the third and fourth display devices are connected. The load distribution module 206 determines that stream B is to be displayed on the second display device 203*b*, and therefore stream B is sent to the second GPU 202, and stream C is to be displayed on the first display device 203*a*, and therefore stream C is sent to the first GPU 201.

If, at step S503, the load distribution module 206 determines that the selected GPU for a stream is overloaded, it sends the stream to a different decoding resource. The different decoding resource could be another of the GPUs 201, 202, 205, or it could be a software decoding module running on the CPU.

There are various ways in which the different decoding resource can be selected, if the selected GPU is overloaded. It could be selected based on loads or numbers of decoding processes. However, preferably the resource with the highest maximum bitrate which is not overloaded is chosen. Whether the resource is overloaded could be determined based on a threshold (eg 80%) or the same method described below with respect to FIG. 7.

Figure 6:
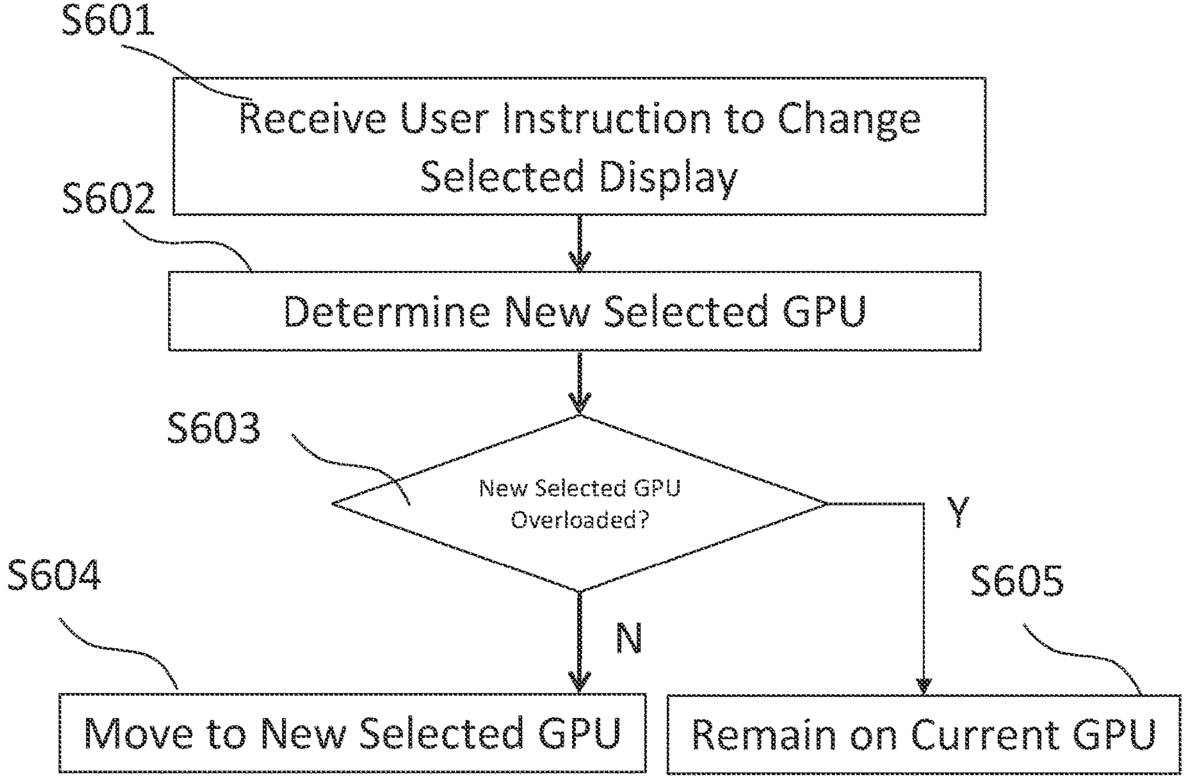
FIG. 6 is a flow diagram illustrating a method of load distribution when an existing stream is moved to be displayed on a different display device.

FIG. 6 is a flow diagram illustrating the operation of the load distribution module 206 to redistribute a stream of video that is already being decoded on a GPU and displayed on a display device connected to that GPU. At step S601, an instruction is received to change the display device on which the stream is being displayed to a new selected display device. At step S602, the load distribution module determines a new selected GPU as the GPU to which the new selected display device is connected. At step S603, the load distribution module 206 then determines if the new selected GPU is overloaded and, if it is not, at step S604, moves the decoding of the stream to the new selected GPU. If the new selected GPU is overloaded, the stream preferably remains on the current GPU (step S605), but it could be moved to CPU (software decoding) or another GPU selected based on loading.

In both the methods of FIGS. 5 and 6 there is a need for a method of determining whether a selected GPU is overloaded. Because sending a stream to a different decoding resource other than the GPU connected to the display device on which the stream is to be displayed will always result in a loss of performance, it is preferable to avoid doing this in as many cases as possible. The load distribution module 206 may determine whether the selected GPU is overloaded by comparing the load with a threshold (eg 80%) and determining that the selected GPU is overloaded if the load is above the threshold. However, it is preferable to provide a method of maximising the load on a GPU, to maximise the capacity of the GPU.

Figure 7:
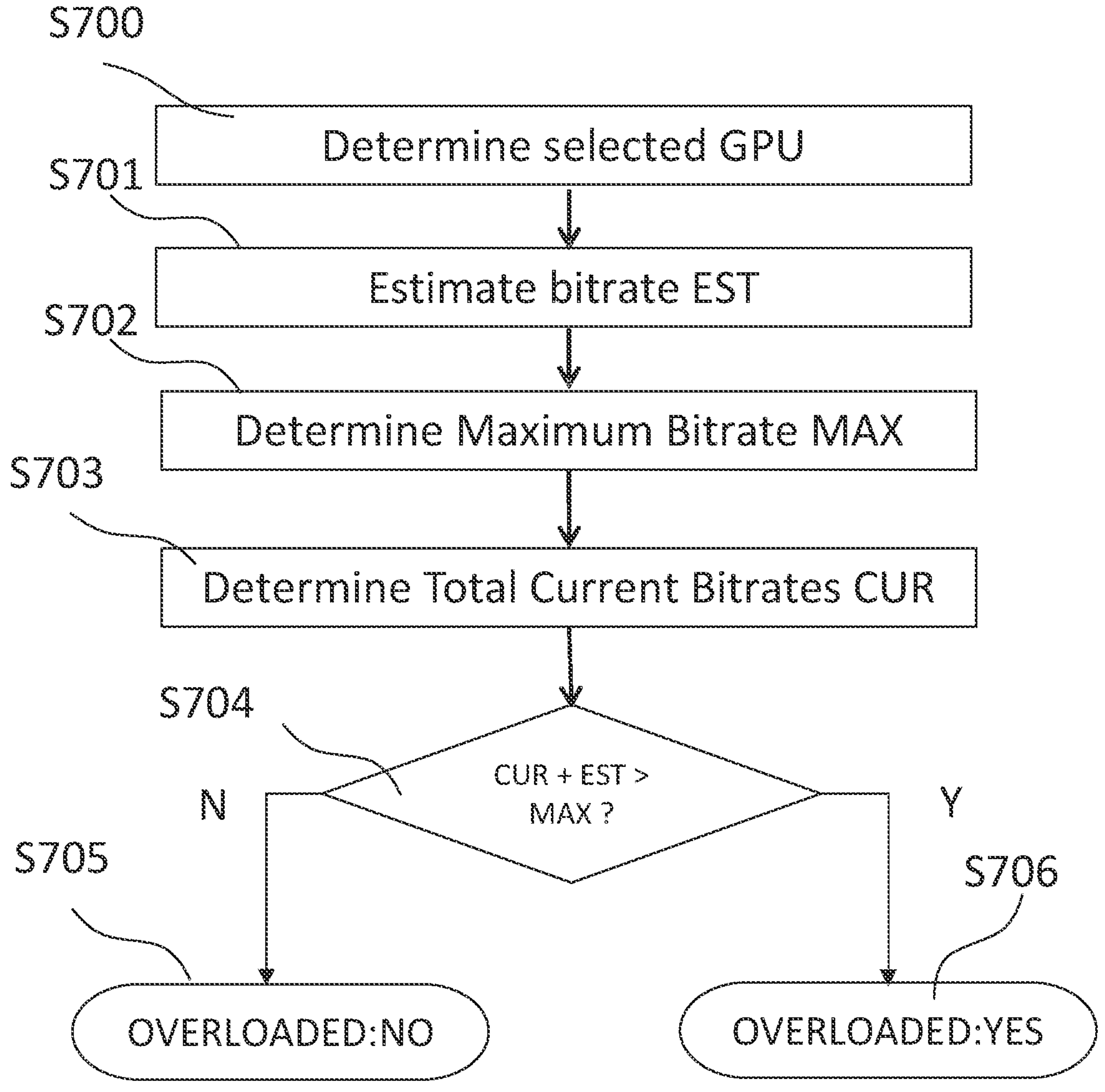
FIG. 7 is a flow diagram illustrating a method of determining if a selected GPU is overloaded.

FIG. 7 is a flow chart illustrating a method of determining if a selected GPU is overloaded, according to a second aspect of the present disclosure.

At step S700, the load distribution module 206 determines a selected GPU for decoding a stream of video data. This may be a new stream of video data that a user requests to be displayed, or a stream that is already being decoded and displayed, and a user requests that the stream be displayed on a different display device. At step S701, the load distribution module estimates a bitrate EST required to decode the stream of video data, or this can be measured if it is a stream already being decoded on another GPU. At step S702, the load distribution module 206 estimates the maximum bitrate MAX for the selected GPU. At step S703, the load balancing module 206 determines the total bitrate CUR of decoding processes currently running on the selected GPU. Steps S701, S702 and S703 can be carried out in any order or simultaneously.

At step S704, the load balancing module 206 determines if the selected GPU is overloaded by determining if decoding the stream of video data on the selected GPU would exceed a maximum bitrate of the GPU (CUR+EST>MAX). If it would, then it is determined that the selected GPU is overloaded (S706), if not then the selected GPU is not overloaded (S705).

Therefore, in a second aspect of the present disclosure, when the load distribution module 206 selects a GPU for decoding a stream of video data, the load distribution module 206 determines if the selected GPU is overloaded by estimating a bitrate required to decode the stream of video data, determining the total bitrate of decoding processes currently running on the selected GPU and determining that the selected GPU is overloaded if decoding the stream of video data on the selected GPU would exceed a maximum bitrate of the GPU.

The maximum bitrate for each GPU may be a known parameter, and the load distribution module 206 may store a lookup table of the maximum bitrate for each of the GPUs 210, 202, 205.

The maximum bitrates may also be calculated based on the bitrates of current decoding processes and a current load.

For example—

The following streams are decoding on a GPU:

(1) Stream decoding at 5000 bitrate (2) Stream decoding at 5000 bitrate (3) Stream decoding at 10000 bitrate Therefore, the total bitrate is 20000. If the utilization of the GPU in question is 20% loaded, then the theoretical maximum of that GPU is therefore:

$$20000/20(\text{percent})*100(\text{percent}) = 100{,}000 \text{ bitrate}.$$

The theoretical maximum need not be calculated every time a stream is to be allocated to a decoding resource. This could be calculated periodically and updated in a lookup table which can be consulted by the load distribution module 206. For example, this could be updated daily, or hourly.

Another option for determining the maximum bitrate of each GPU would be to run a program that measures the GPU performance by loading it to 100% and recording the actual maximum bitrate. Again, the maximum bitrate can be stored in a lookup table for each of the GPUs, which can be consulted by the load distribution module 206, and this could be updated by re-running the program periodically. This would allow for degradation of performance of GPUs over time.

In the process of FIG. 7, When the load distribution module 206 determines whether a selected GPU is overloaded, at step S701 it estimates the bitrate EST required for decoding the new stream.

This can be estimated based on the frame width and height (in pixels), number of bit planes and frames per second as:

$$\text{Bitrate per second} = \text{WidthOfFrame}*\text{HeightOfFrame}*\text{NumberOfBitplanes}*\text{FramesPerSecond}.$$

The above method of maximising the load on a single GPU is relevant to any load balancing method in a hardware accelerated video surveillance system, as well as the one shown in FIG. 4 which is distributing decoding processes for display on display devices. For example, hardware acceleration and load balancing may be used in other parts of the video surveillance system of FIG. 1 where the decoding is not for display and therefore there is no need to take into account the connection between GPUs and display devices. For example, decoding may occur in an analytics server or a recording server where motion detection or other video analytics are being carried out that require decoding of the video. However, the method is particularly useful in the system of FIG. 4 and the architecture of FIG. 3B or 3C when it is desirable to keep decoding as much as possible on a specific GPU corresponding to the display device on which the video is being displayed.

While the present disclosure has been described with reference to embodiments, it is to be understood that the present disclosure is not limited to the disclosed embodiments. The present disclosure can be implemented in various forms without departing from the principal features of the present disclosure as defined by the claims.

The invention claimed is:

1. A video surveillance system comprising an operator client comprising:

a system memory;

a plurality of display devices for displaying video data;

resources for decoding of encoded video data for display, including a plurality of GPUS;

wherein each of the display devices is connected to a graphics output port of one of the GPUs; and a load distribution module configured to send a stream of encoded video data to one of the decoding resources;

wherein the load distribution module is configured to:

determine a first display device which is a display device the stream of video data is to be displayed on after decoding;

send the stream of video data to a first GPU for decoding and display on the first display device, wherein the first GPU is the GPU to which the first display device is connected, unless the first GPU is overloaded; and when the first GPU is overloaded, send the stream of video data to a second GPU for decoding and display on the first display device, wherein, when the stream of video data is sent to the first GPU for decoding, the first GPU decodes and renders frames of the video data and outputs the frames to the first display device via the graphics output port of the first GPU to the first display device; and when the stream of video data is sent to the second GPU, the second GPU decodes frames of the video data, copies the frames via the system memory to the first GPU and the first GPU renders the frames and outputs the frames to the first display device via the graphics output port of the first GPU to the first display device.

2. The system according to claim 1, wherein each of the GPUs has at least one display device connected to it, each display device being connected to a different graphics output port.

3. The system according to claim 1, wherein the resources for decoding of encoded video data further include resources for software decoding comprising a video codec program module executable by at least one CPU core, and the GPUs include at least one discrete GPU and an integrated GPU provided as a chip inside the CPU.

4. The system according to claim 1, wherein if the first GPU is overloaded, the load distribution module sends the stream of video data to the second GPU which is selected as the GPU having a highest maximum bitrate for decoding and which is not overloaded.

5. The system according to claim 1, wherein a GPU is determined to be overloaded if it has a load higher than a threshold.

6. The system according to claim 1, wherein the load distribution module is configured to determine if a GPU is overloaded by:

estimating a bitrate required to decode the stream of video data, determining the total bitrate of decoding processes currently running on the GPU and determining that the GPU is overloaded if decoding the stream of video data on the GPU would exceed a maximum bitrate of the GPU.

7. The system according to claim 6, wherein the load distribution module is configured to estimate the maximum bitrate of the GPU, based on a current load and the bitrates of current decoding processes.

8. The system according to claim 6, wherein the bitrate required to decode the stream of video data is estimated as:

$$\text{Bitrate per second} = \text{WidthOfFrame} * \text{HeightOfFrame} * \text{NumberOfBitplanes} * \text{FramesPerSecond}.$$

9. A load distribution method for video decoding in a video surveillance system comprising an operator client comprising a system memory, a plurality of display devices for displaying video data and resources for decoding of encoded video data for display, the resources including a plurality of GPUs, wherein each of the display devices is connected to a graphics output port of one of the GPUs, the method comprising sending a stream of video data to a decoding resource by:

determining a first display device which is a display device the stream of video data is to be displayed on after decoding;

determining a first GPU, wherein the first GPU is the GPU to which the first display device is connected;

determining whether the first GPU is overloaded;

when the first GPU is not overloaded, sending the stream of video data to the first GPU for decoding and displaying the video data on the first display device; and when the first GPU is overloaded, sending the stream of video data to a second GPU for decoding, and displaying the video data on the first display, wherein, when the stream of video data is sent to the first GPU for decoding, the first GPU decodes and renders frames of the video data and outputs the frames to the first display device via the graphics output port of the first GPU to the first display device; and when the stream of video data is sent to the second GPU, the second GPU decodes frames of the video data, copies the frames via the system memory to the first GPU and the first GPU renders the frames and outputs the frames to the first display device via the graphics output port of the first GPU to the first display device.

10. The method according to claim 9, wherein when the first GPU is overloaded, the stream of video data is sent to the second GPU which is selected as the GPU having a highest maximum bitrate for decoding and which is not overloaded.

11. The method according to claim 9, comprising determining when a GPU is overloaded by:

estimating a bitrate required to decode the stream of video data, determining the total bitrate of decoding processes currently running on the GPU and determining that the GPU is overloaded when decoding the stream of video data on the GPU would exceed a maximum bitrate of the GPU.

12. The method according to claim 11, further comprising estimating the maximum bitrate of the GPU, based on a current load and the bitrates of current decoding processes.

13. The method according to claim 11, wherein the bitrate required to decode the stream of video data is estimated as:

Bitrate per second=WidthOfFrame*HeightOfFrame*NumberOfBitplanes *FramesPerSecond.

14. A non-transitory computer-readable medium storing a program which, when executed causes an apparatus to perform a load distribution method for video decoding in a video surveillance system comprising an operator client comprising a system memory, a plurality of display devices for displaying video data and resources for decoding of encoded video data for display, the resources including a plurality of GPUs, wherein each of the display devices is connected to a graphics output port of one of the GPUs, the method comprising sending a stream of video data to a decoding resource by:

determining a first display device which is a display device the stream of video data is to be displayed on after decoding;

determining a first GPU, wherein the first GPU is the GPU to which the first display device is connected;

determining whether the first GPU is overloaded;

when the first GPU is not overloaded, sending the stream of video data to the first GPU for decoding and displaying the video data on the first display device; and when the first GPU is overloaded, sending the stream of video data to a second GPU for decoding, and displaying the video data on the first display, wherein, when the stream of video data is sent to the first GPU for decoding, the first GPU decodes and renders frames of the video data and outputs the frames to the first display device via the graphics output port of the first GPU to the first display device; and when the stream of video data is sent to the second GPU, the second GPU decodes frames of the video data, copies the frames via the system memory to the first GPU and the first GPU renders the frames and outputs the frames to the first display device via the graphics output port of the first GPU to the first display device.

* * * * *